United States Patent
Cui et al.

(10) Patent No.: US 11,070,999 B2
(45) Date of Patent: Jul. 20, 2021

(54) GAP PATTERN DESIGN FOR NEW RADIO (NR) SYSTEMS

(71) Applicant: APPLE INC., Cupertino, CA (US)

(72) Inventors: Jie Cui, Santa Clara, CA (US); Yuan Zhu, Beijing (CN); Candy Yiu, Portland, OR (US); Rui Huang, Beijing (CN); Yang Tang, San Jose, CA (US); Shuang Tian, Santa Clara, CA (US); Dae Won Lee, Portland, OR (US)

(73) Assignee: APPLE INC., Cupertino, CA (US)

( * ) Notice: Subject to any disclaimer, the term of this patent is extended or adjusted under 35 U.S.C. 154(b) by 24 days.

(21) Appl. No.: 16/499,747

(22) PCT Filed: May 1, 2018

(86) PCT No.: PCT/US2018/030482
§ 371 (c)(1),
(2) Date: Sep. 30, 2019

(87) PCT Pub. No.: WO2018/204383
PCT Pub. Date: Nov. 8, 2018

(65) Prior Publication Data
US 2021/0058807 A1 Feb. 25, 2021

Related U.S. Application Data

(60) Provisional application No. 62/516,338, filed on Jun. 7, 2017, provisional application No. 62/500,243, filed on May 2, 2017.

(51) Int. Cl.
*H04W 24/10* (2009.01)
*H04L 1/16* (2006.01)
(Continued)

(52) U.S. Cl.
CPC ........... *H04W 24/10* (2013.01); *H04L 1/1614* (2013.01); *H04W 56/001* (2013.01); *H04W 88/06* (2013.01)

(58) Field of Classification Search
CPC combination set(s) only.
See application file for complete search history.

(56) References Cited

U.S. PATENT DOCUMENTS

| 2018/0036379 | A1* | 2/2018 | Chevrier | ................. A61P 17/06 |
| 2020/0154372 | A1* | 5/2020 | Chae | ................... H04W 52/383 |
| 2020/0383060 | A1* | 12/2020 | Park | ..................... H04L 5/0048 |

FOREIGN PATENT DOCUMENTS

| EP | 2947923 A1 | 11/2015 |
| WO | 2015018025 A1 | 2/2015 |

(Continued)

OTHER PUBLICATIONS

Ericsson , "Way Forward for NR Measurement Gaps", R4-1709889, 3GPP Draft, Sep. 22, 2017, 4 pages.

(Continued)

*Primary Examiner* — Julio R Perez

(57) ABSTRACT

Technology for a user equipment (UE) operable to decode measurement gap patterns received from a Next Generation NodeB (gNB) is disclosed. The UE can decode a per-frequency range (per-FR) measurement gap pattern received from the gNB in a New Radio (NR) system. The per-FR measurement gap pattern can indicate a measurement gap partem for monitoring selected frequency layers within a frequency range at the UE. The UE can process one or more measurements for the selected frequency layers within the frequency range. The one or more measurements for the selected frequency layers can be measured in accordance with the per-FR measurement gap pattern. The UE can (Continued)

encode the one or more measurements for the selected frequency layers for reporting to the gNB.

26 Claims, 14 Drawing Sheets

(51) Int. Cl.
*H04W 56/00* (2009.01)
*H04W 88/06* (2009.01)

(56) References Cited

FOREIGN PATENT DOCUMENTS

| WO | 2015023222 A1 | 2/2015 |
| WO | 2015126568 A1 | 8/2015 |
| WO | 2018204383 A1 | 11/2018 |

OTHER PUBLICATIONS

Intel Corporation, "Motivation for New WI: Measurement Gap Enahancement", R4-160169, 3GPP TSG-RAN WG4 Meeting #78, St. Julian's, Malta, Agenda Item 11, Feb. 15-19, 2016, 3 pages.
Intel Corporation, "On measurement gap for NR", R4-1707418, 3GPP TSG-RAN WG4 Meeting #84, Berlin, Germany, Agenda Item 9.6.4, Aug. 21-25, 2017, 6 pages.
PCT/US2018/030482, International Search Report and Written Opinion, dated Sep. 5, 2018, 15 pages.
Samsung, "Further Discussion on Measurement Gap for Multiple Frequency Layers", R4-1711027, 3GPP TSG-RAN WG4 Meeting #84Bis, Dubrovnik, Croatia. Agenda Item 9.7.4.3, Oct. 9-13, 2017, 2 pages.

\* cited by examiner

GAP PATTERN DESIGN FOR NEW RADIO (NR) SYSTEMS

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
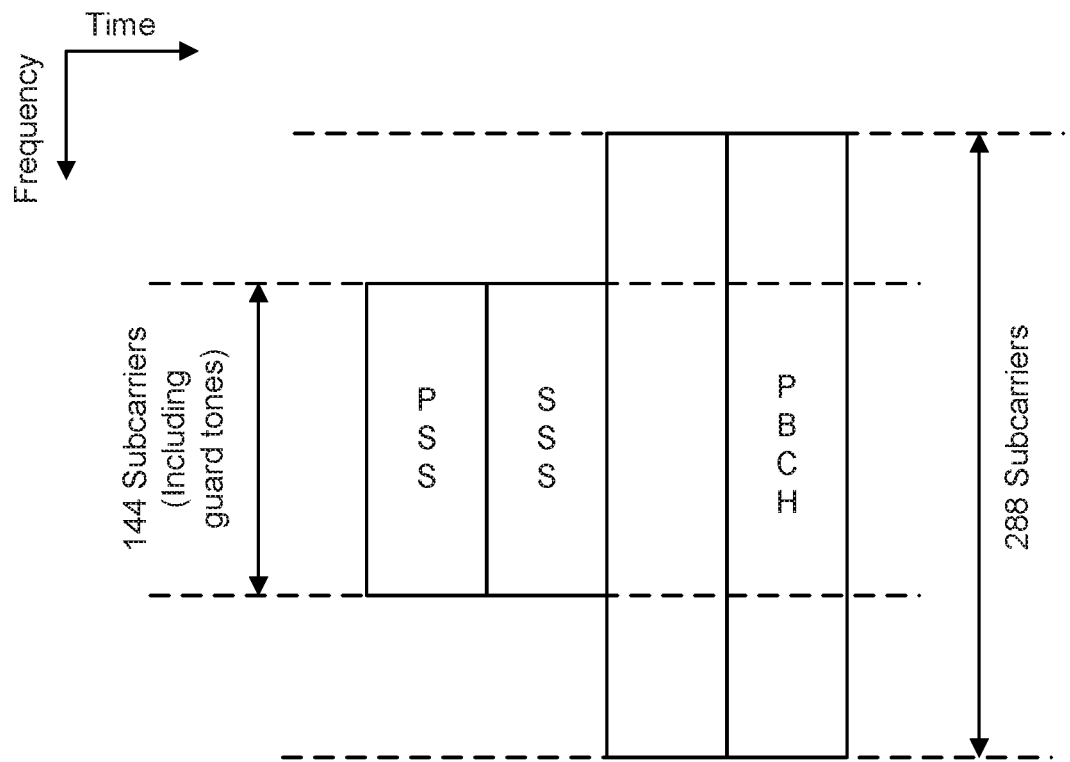
FIG. 1 illustrates a synchronization signal (SS) block in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Gap Pattern Design for NR

In one configuration, in a New Radio (NR) wireless communication system, a new synchronization signal (SS) can be designed to be used for cell identification, measurement, and so on. The design of the NR SS is described below.

In one example, a set of configuration values for an SS burst set periodicity can be applicable for UEs in a radio resource control (RRC) connected mode or idle mode that are operating in standalone NR cells, as well as for UEs that are operating in non-standalone NR cells. The SS burst set periodicity can be a period in which a same SS block is repeated. The set of configuration values for the SS burst set periodicity can be specified as follows: {5, 10, 20, 40, 80, 160}, and can be expressed in milliseconds (ms). A maximum number of SS blocks (L) can be defined based on a corresponding frequency range. For example, for up to 3 Gigahertz (GHz), L can be selected from [1, 2, 4], from 3 GHz to 6 GHz, L can be selected from [4, 8], and from 6 GHz to 52.6 GHz, L can be equal to [64].

FIG. 1 illustrates an example of a synchronization signal (SS) block. The SS block can include one symbol for a primary synchronization signal (PSS), one symbol for a secondary synchronization signal (SSS), and two or more symbols for a physical broadcast channel (PBCH). The PSS and the SSS can span over 144 subcarriers (including guard tones), whereas the PBCH can span over 288 subcarriers.

Figure 2:
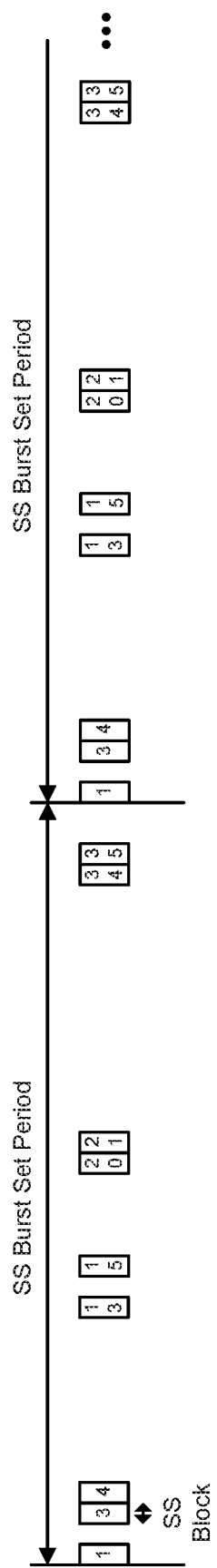
FIG. 2 illustrates a synchronization signal (SS) burst set in accordance with an example.

FIG. 2 illustrates an example of a synchronization signal (SS) burst set. The SS burst set can be in accordance with an SS burst set period and can be repeated one or more times. In the SS burst set, one or more SS blocks can be defined, and there can be gaps between SS blocks within the SS burst set. In one example, a network can configure a bitmap to indicate which SS blocks are punctured (i.e., which blocks are left blank). For example, when a maximum SS block number (L) is 4 and a SS burst set period is 5 ms and the bitmap indicates that no SS block is punctured, then there are 4 continuous SS blocks in this 5 ms period, but symbols for a physical dedicated control channel (PDCCH) may not be used by the SS.

In one example, in the 5G NR system, since the SS can have a different periodicity on different frequency layers (or frequency points) or for different cells, an identical measurement gap pattern may not be feasible for measurement, which can be quite different from the legacy LTE system. For example, in legacy LTE, the PSS/SSS periodicity is fixed as 5 ms, so an identical measurement gap pattern with a 6 ms gap can apply for all cells on all frequency layers to cover at least one PSS/SSS copy. However, in order to support the measurement or cell identification in the NR system, the measurement gap pattern is to be redesigned and network assistance can be used to convey the measurement gap pattern to the UE. In other words, in the NR system, the measurement gap pattern for the UE may not be fixed, which is in contrast to the legacy LTE system.

In the present technology, a network can send measurement assistance information to a UE that indicates a per-frequency range (per-FR) measurement gap pattern for the UE. The per-FR measurement gap pattern can be used for a frequency range in which the UE uses a per-FR measurement gap for concurrent monitoring of all frequency layers of each frequency range independently using the per-FR measurement gap pattern. In this example, the UE can support independent measurement gap patterns for different frequency ranges. The UE can use per-RF measurement gap pattern(s) received from the network to identify and measure intra-frequency cells and/or inter-frequency cells and/or inter-radio access technology (RAT) E-UTRAN cells. The UE can report measurements collected at the UE in accordance with the per-RF measurement gap pattern(s) to the network.

In one example, the per-FR measurement gap pattern can include a gap pattern identifier (ID) that corresponds to the per-FR measurement gap pattern, a measurement gap length (MGL) that corresponds to the per-FR measurement gap pattern and/or a measurement gap repetition period (MGRP) that corresponds to the per-FR measurement gap pattern. As an example, the MGL can be equal to 6 ms and the MGRP can be equal to 40 ms. The gap pattern ID can also be referred to as a measurement gap pattern or a type indication.

In a first example, a network can send measurement assistance information to a UE for each band/frequency group (or range). The measurement assistance information can include, but is not limited to, a band/frequency group identifier (ID) that indicates an index for a band/frequency group, an absolute band/frequency, a gap time offset within a gap periodicity, a gap length, the gap periodicity, a gap number that indicates an amount of gap assigned to the band/frequency group, an SS block number that indicates a potential number of SS blocks within a measurement gap, and an SS block bitmap to indicate which SS blocks are punctured.

In a second example, the network can send measurement assistance information to the UE for each band/frequency. In this example, the measurement assistance information can include, but is not limited to, an absolute band/frequency, a gap time offset within a gap periodicity, a gap length, the gap periodicity, a gap number that indicates an amount of gap assigned to the band/frequency, an SS block number that indicates a potential number of SS blocks within a measurement gap, and an SS block bitmap to indicate which SS blocks are punctured.

In a third example, the network can send measurement assistance information to the UE for each cell. In this example, the measurement assistance information can include, but is not limited to, an absolute band/frequency, a physical cell ID (PCI), a gap time offset within a gap periodicity, a gap length, the gap periodicity, a gap number that indicates an amount of gap assigned to the band/frequency group, an SS block number that indicates a potential number of SS blocks within a measurement gap, and an SS block bitmap to indicate which SS blocks are punctured.

In a fourth example, a reference signal received power (RSRP)/reference signal received quality (RSRQ) measurement constraint can assume an omnidirectional receive (Rx) antenna at the UE or can assume a non-beamforming Rx antenna at the UE.

In a fifth example, an uplink transmission constraint (e.g., random access constraint or transmit (Tx) timing constraint) can assume an omnidirectional Tx antenna at the UE or can assume a non-beamforming Tx antenna at the UE.

In one configuration, a network can send measurement assistance information to a UE for each band/frequency group. The measurement assistance information can be used to indicate a measurement gap pattern to the UE. Based on the measurement assistance information, the UE can receive SS blocks received from the network. The measurement assistance information can include, but is not limited to, a band/frequency group identifier (ID) that indicates an index for a band/frequency group, an absolute band/frequency, a gap time offset within a gap periodicity, a gap length, the gap periodicity, a gap number that indicates an amount of gap assigned to the band/frequency group, an SS block number that indicates a potential number of SS blocks within a measurement gap, and an SS block bitmap to indicate which SS blocks are punctured.

As an example, a UE can be configured for measurement of frequency 1 (F1), frequency 2 (F2), frequency 3 (F3) and frequency 4 (F4). In this example, F1 and F2 can be in the same band/frequency group 1 (such that measurement assistance information can be applied for target cells on both F1 and F2), and F3 and F4 can be in the same band/frequency group 2 (such that measurement assistance information can be applied for target cells on both F3 and F4).

Figure 3:
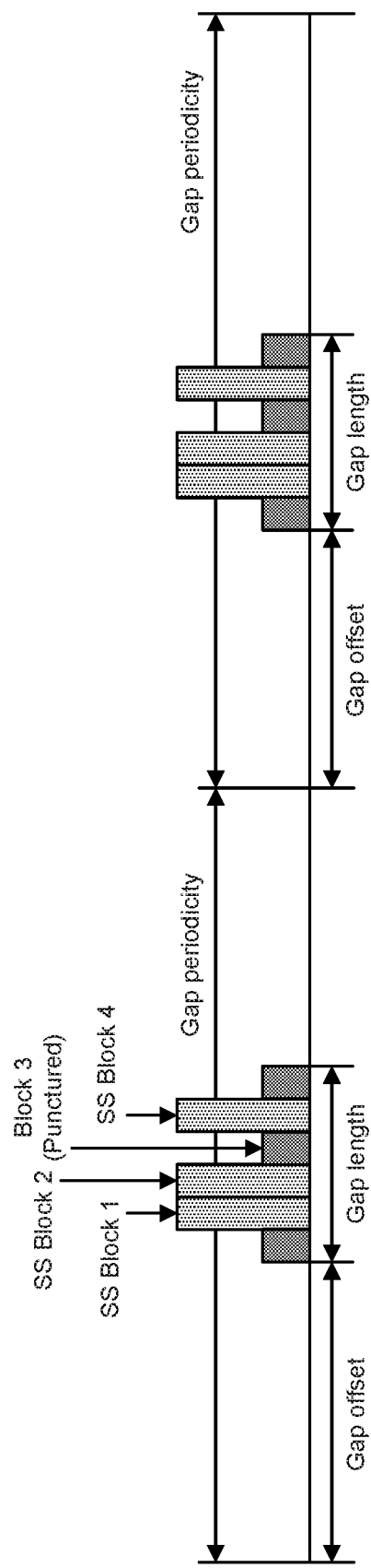
FIG. 3 illustrates a transmission of measurement assistance information in accordance with an example.

FIG. 3 illustrates an example of a transmission of measurement assistance information from a network to a UE.

The measurement assistance information can include a band/frequency ID, an absolute band/frequency, a gap time offset within a gap periodicity, a gap length, the gap periodicity, a gap number, an SS block number, and an SS block bitmap. In this example, the SS block number is equal to 4. The SS can be transmitted in block 1, block 2 and block 4. In this example, since block 3 is punctured, the SS block bitmap can be indicated as '1101' (i.e., block 3 is punctured and corresponds to the '0' in the bitmap, and blocks 1, 2 and 4 are used to transmit the SS and corresponds to the '1's in the bitmap).

In one configuration, a network can send measurement assistance information to a UE for each band/frequency. The measurement assistance information can be used to indicate a measurement gap pattern to the UE. In this example, the granularity for this indication can be associated with an individual frequency layer, as opposed to the band/frequency group (or a frequency range). The measurement assistance information can include, but is not limited to, an absolute band/frequency, a gap time offset within a gap periodicity, a gap length, the gap periodicity, a gap number that indicates an amount of gap assigned to the band/frequency, an SS block number that indicates a potential number of SS blocks within a measurement gap, and an SS block bitmap to indicate which SS blocks are punctured.

As an example, a UE can be configured for measurement of frequency 1 (F1) and frequency 2 (F2). In this example, target cells on F1 can use the same measurement assistance information, and target cells on F2 can use the same measurement assistance information. Based on the measurement assistance information received from the network, the UE can derive a gap location for each frequency, and the UE can determine a number of gaps that can be used for measurement on this frequency.

As an example, the network can transmit measurement assistance information to a UE, and in this example, the SS block number is equal to 4. The SS can be transmitted in block 1, block 3 and block 4. In this example, since block 2 is punctured, the SS block bitmap can be indicated as '1011' (i.e., block 2 is punctured and corresponds to the '0' in the bitmap, and blocks 1, 3 and 4 are used to transmit the SS and corresponds to the '1's in the bitmap).

In one configuration, a network can send measurement assistance information to a UE for each cell. For each cell, the network can indicate this measurement assistance information to the UE. The measurement assistance information can be used to indicate a measurement gap pattern to the UE. In this example, the measurement assistance information can include, but is not limited to, an absolute band/frequency, a physical cell ID (PCI), a gap time offset within a gap periodicity, a gap length, the gap periodicity, a gap number that indicates an amount of gap assigned to the band/frequency group, an SS block number that indicates a potential number of SS blocks within a measurement gap, and an SS block bitmap to indicate which SS blocks are punctured.

As an example, a UE can be configured for measurement of a first cell (cell 1) and a second cell (cell 2). The network can send to the UE measurement assistance information for the first cell, as well as measurement assistance information for the second cell. Based on the measurement assistance information received from the network, the UE can derive a gap location for each cell, and the UE can determine a number of gaps that can be used for measurement for that cell.

As an example, the network can transmit measurement assistance information to a UE, and in this example, the SS block number is equal to 4. The SS can be transmitted in block 2, block 3 and block 4. In this example, since block 1 is punctured, the SS block bitmap can be indicated as '0111' (i.e., block 1 is punctured and corresponds to the '0' in the bitmap, and blocks 2, 3 and 4 are used to transmit the SS and corresponds to the '1's in the bitmap).

In one configuration, a RSRP/RSRQ measurement constraint can assume an omnidirectional Rx antenna at the UE or can assume a non-beamforming Rx antenna at the UE. As an example, a radio resource management (RRM) measurement for RSRP/RSRQ can be designed based on Tx beamforming at a gNB side, but omnidirectional Rx at the UE. In addition, a measurement period can be scaled by a Tx beam number of the gNB based on a legacy necessity period without any Tx or Rx beam.

In one configuration, an uplink transmission constraint (e.g., random access constraint or Tx timing constraint) can assume an omnidirectional Tx antenna at the UE or can assume a non-beamforming Tx antenna at the UE. For example, an RRM measurement for random access can be designed based on omnidirectional Rx at a UE side and omnidirectional Tx at the UE.

Measurement Resource Management for NR

In one configuration, with respect to a SS block composition, a New Radio (NR)-PSS, an NR-SSS and an NR-PBCH can be present in every SS block. The NR-PSS can be mapped before the NR-SSS in the SS block. When a number of PBCH symbols within the SS block is two, a first option can involve mapping an ordering within the SS block as PSS-SSS-PBCH-PBCH, a second option can involve mapping an ordering within the SS block as PSS-PBCH-SSS-PBCH, a third option can involve mapping an ordering within the SS block as PBCH-PSS-SSS-PBCH, and a fourth option can involve mapping an ordering within the SS block as PSS-PBCH-PBCH-SSS, where a selection of one of the four options can be performed together with an NR-PBCH design decision.

In one example, possible SS block time locations can be mapped accordingly. For example, in a mapping with 15 and 30 kilohertz (kHz) subcarrier spacing, at least 1 or 2 symbol can be preserved for DL control at a beginning of a slot of 14 symbols, at least 2 symbols can be preserved for a guard period and UL control at an end of the slot of 14 symbols, where a slot can be defined based on an SS subcarrier spacing, and at most two possible SS block time locations can be mapped to one slot of 14 symbols. In another example, in a mapping with 120 kHz subcarrier spacing, at least 2 symbol can be preserved for DL control at a beginning of a slot of 14 symbols, at least 2 symbols can be preserved for a guard period and UL control at an end of the slot of 14 symbols, where a slot can be defined based on an SS subcarrier spacing, and at most two possible SS block time locations can be mapped to one slot of 14 symbols. In yet another example, in a mapping with 240 kHz subcarrier spacing across two consecutive slots, at least 4 symbol can be preserved for DL control at a beginning of a first slot of 14 symbols, at least 4 symbols can be preserved for a guard period and UL control at an end of a second slot of 14 symbols, where a slot can be defined by the 240 kHz subcarrier spacing, and at most four possible SS block time locations can be mapped to two consecutive slots of 14 symbols each.

In one example, an SS block may not cross a middle of the slot of 14 symbols defined by the 15 kHz sub-carrier spacing. The mapping of SS block time locations can also be defined for NR unlicensed band operation. The possible SS block time locations, as described above, does not preclude 7 OFDM symbol slot operation In one example, a transmission of SS blocks within an SS burst set can be confined to a 5 ms window, regardless of a SS burst set periodicity. Within this 5 ms window, a number of possible candidate SS block locations can be represented by L. The maximum number of SS-blocks within the SS burst set (L) for different frequency ranges can be defined as follows: L is equal to 4 for a frequency range up to 3 GHz, L is equal to 8 for a frequency range from 3 GHz to 6 GHz, and L is equal to 64 for a frequency range from 6 GHz to 52.6 GHz.

In one configuration, in the 5G NR system, since the SS can have a different periodicity on different frequency layers or for different cells, a measurement gap pattern or measurement resource allocation can be further improved for NR measurement, which can be quite different from the legacy LTE system. For example, in legacy LTE, the PSS/SSS periodicity is fixed as 5 ms, so a measurement gap pattern with a 6 ms gap can apply for all cells on all frequency layers to cover at least one PSS/SSS copy. However, in order to conduct the measurement for new NR reference signals, multiple frequency layers and multiple SS block configurations can be considered in parallel.

In a first example, with respect to frequency layers in one identical frequency group, SS or reference signals in a corresponding SS burst set periodicity on these frequency layers can be within an identical measurement gap length (MGL) or gap or certain time period. For example, when SS bursts of different frequency layers are in the same group (within a same MGL), the network can configure one single gap pattern to cover all the SS bursts of those frequency layers, which can be more efficient from a network configuration perspective and from a UE implementation perspective. Alternatively, a time difference between an earliest timing of the SS or reference signal in the corresponding SS burst set periodicity on these frequency layers and a latest timing of the SS or reference signal in the corresponding SS burst set periodicity on these frequency layers can be equal to or smaller than the MGL or the certain time period. Alternatively, the SS burst set periodicity on these frequency layers can be equal to or smaller than a measurement gap repetition period (MGRP), or the SS burst set periodicity on these frequency layers can be the same.

In a second example, a bitmap for a measurement gap pattern can be used to indicate gap usage availability in a time sequence. The bitmap can be used to indicate which gap occasion is available or punctured/muted, e.g., "1" indicates that a gap occasion is available to use, and "0" indicates that a gap occasion is punctured or muted and not available to use.

In a third example, a network can signal assistance information to a UE for NR measurement. The assistance information can include, but is not limited to, a MGRP (e.g., 40 ms or 80 ms), a MGL, a gap offset to indicate a position of a gap duration within a gap periodicity, and a gap bitmap. The MGRP and the MGL can be configured as a per-UE level, e.g., a UE can use the same MGRP and MGL configuration for the measurement on all of the target frequency layers. The gap offset and the gap bitmap can be configured as a per frequency layer or per frequency group level, e.g., a UE can use a different gap offset or gap bitmap configuration for the measurement on different target frequency layers or target frequency groups.

In a fourth example, a network can signal assistance information to a UE for NR measurement, where the assistance information can include, but is not limited to, a MGRP (e.g., 40 ms or 80 ms), a MGL, and a gap offset to indicate a position of a gap duration within a gap periodicity. The MGRP and the MGL can be configured as a per-UE level, e.g., a UE can use the same MGRP and MGL configuration for the measurement on all of the target frequency layers. The gap offset can be configured as a per frequency layer or per frequency group level, e.g., a UE can use a different gap offset configuration for the measurement on different target frequency layers or target frequency groups. The measurement on different frequency layers or frequency groups can share a measurement resource (e.g., a measurement gap or measurement time). In addition, a total measurement time can be scaled by an amount of frequency layers or frequency groups, e.g., x*MGRP*(number of frequency layers) or y*MGRP*(number of frequency groups), where x is the number of MGRP to conduct the measurement on one frequency layer and y is the number of MGRP to conduct the measurement on one frequency group.

In one configuration, with respect to frequency layers in one identical frequency group, SS or reference signals in a corresponding SS burst set periodicity on these frequency layers can be within an identical measurement gap length (MGL) or gap or certain time period. Alternatively, a time difference between an earliest timing of the SS or reference signal in the corresponding SS burst set periodicity on these frequency layers and a latest timing of the SS or reference signal in the corresponding SS burst set periodicity on these frequency layers can be equal to or smaller than the MGL or the certain time period. Alternatively, the SS burst set periodicity on these frequency layers can be equal to or smaller than a measurement gap repetition period (MGRP), or the SS burst set periodicity on these frequency layers can be the same.

Figure 4:
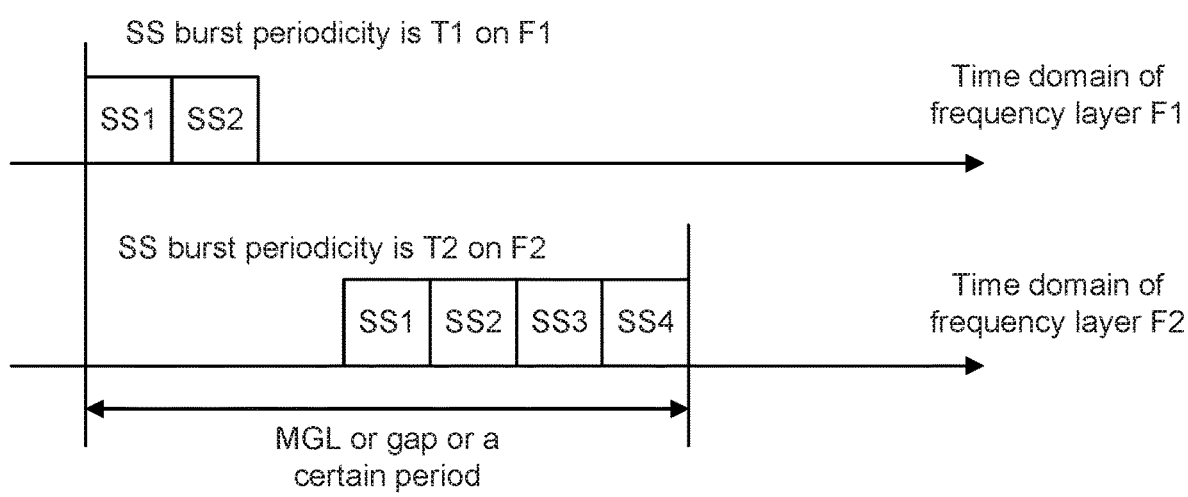
FIG. 4 illustrates a frequency group definition in accordance with an example.

FIG. 4 illustrates an example of a frequency group definition. In this example, on a first frequency layer (F1), there can be 2 SS blocks (SS1 and SS2) in a first SS burst periodicity (T1), and on a second frequency layer (F2), there can be 4 SS blocks (SS1, SS2, SS3 and SS4) in a second SS burst periodicity (T2). When one MGL or gap or certain period (e.g., 6 ms or 5 ms) can contain all the SS blocks in a SS burst T1 on F1 and the SS blocks in a SS burst T2 on F2, then F1 and F2 can be considered as in an identical frequency group.

Figure 5:
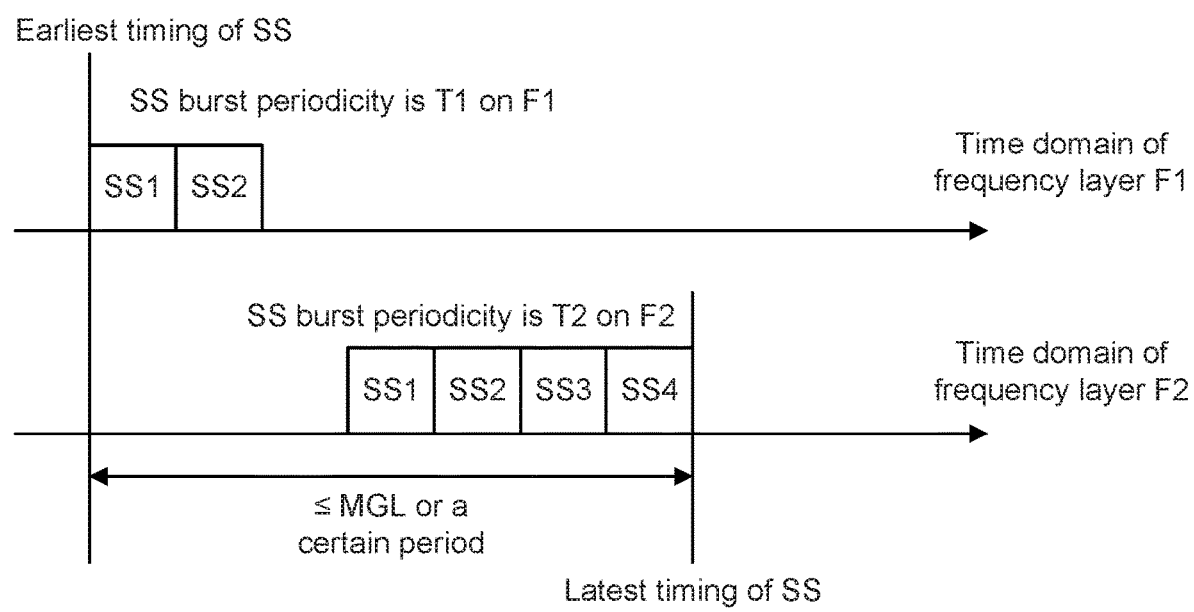
FIG. 5 illustrates another frequency group definition in accordance with an example.

FIG. 5 illustrates an example of a frequency group definition. In this example, on a first frequency layer (F1), there can be 2 SS blocks (SS1 and SS2) in a first SS burst periodicity (T1), and on a second frequency layer (F2), there can be 4 SS blocks (SS1, SS2, SS3 and SS4) in a second SS burst periodicity (T2). When a time difference between an earliest timing of the SS on F1 in T1 and a latest timing of the SS on F2 in T2 is equal to or smaller than an MGL or a certain time period (e.g., 5 ms or 6 ms), then F1 and F2 can be considered as in an identical frequency group.

In one configuration, a bitmap for a measurement gap pattern can be used to indicate gap usage availability in a time sequence. The bitmap can be used to indicate which gap occasion is available or punctured/muted, e.g., "1" indicates that a gap occasion is available to use, and "0" indicates that a gap occasion is punctured or muted and not available to use. As an example, if a configured gap bitmap is equal to '1000', then a first gap in a first MGRP can be available for the UE to perform measurement, but the second, third and fourth gaps in the second, third and fourth MGRP, respectively, are punctured/muted, such that the UE is unable to perform the measurement in the second, third and fourth gap positions.

In one configuration, a network can signal assistance information to a UE for NR measurement. The assistance information can include, but is not limited to, a MGRP (e.g., 40 ms or 80 ms), a MGL, a gap offset to indicate a position of a gap duration within a gap periodicity, and a gap bitmap. The MGRP and the MGL can be configured as a per-UE level, e.g., a UE can use the same MGRP and MGL configuration for the measurement on all of the target frequency layers. The gap offset and the gap bitmap can be configured as a per frequency layer or per frequency group level, e.g., a UE can use a different gap offset or gap bitmap configuration for the measurement on different target frequency layers or target frequency groups.

Figure 6:
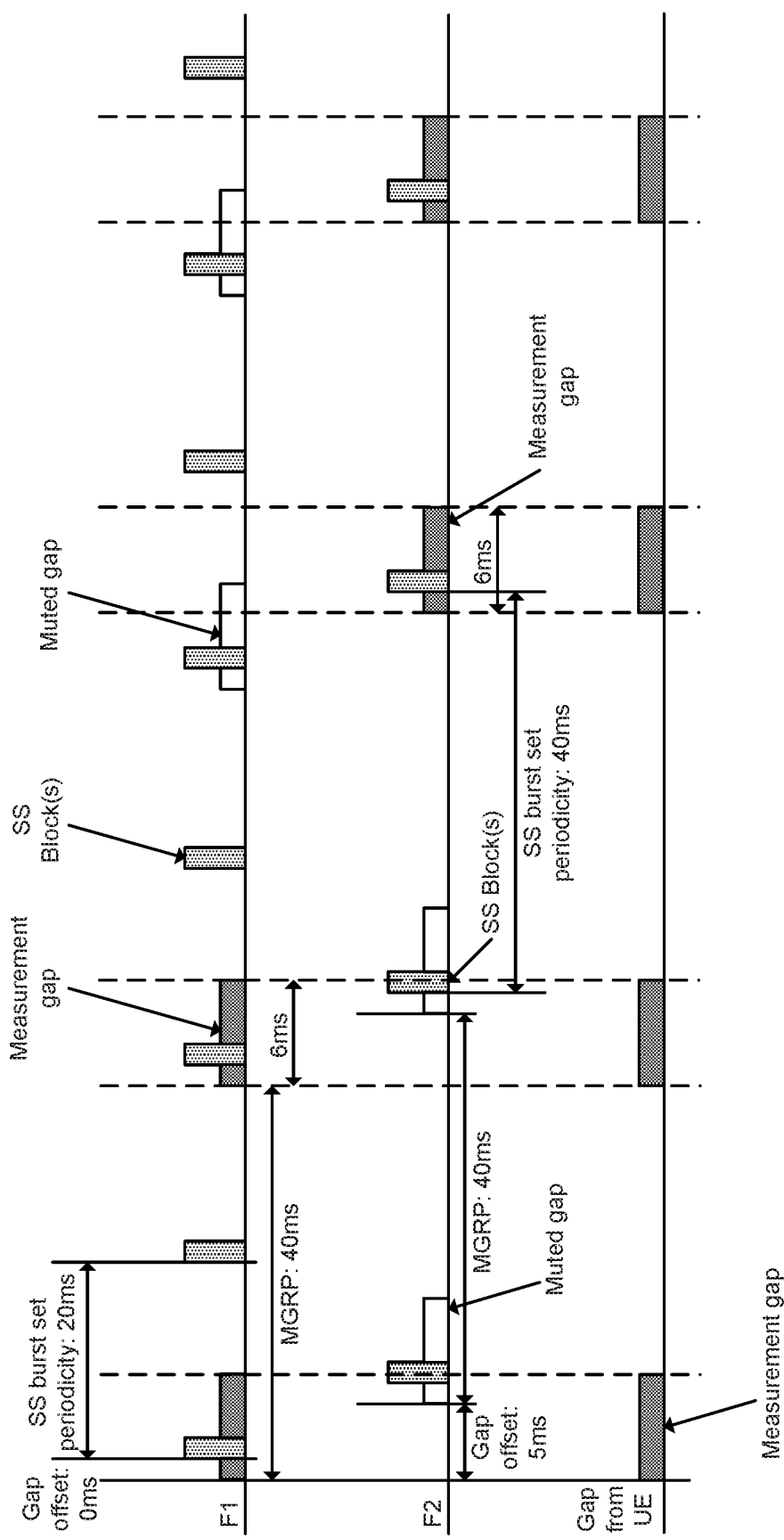
FIG. 6 illustrates signaling of assistance information for New Radio (NR) measurement in accordance with an example.

FIG. 6 illustrates exemplary signaling of assistance information for New Radio (NR) measurement. In this example, there can be a first frequency layer (F1) and a second frequency layer (F2) for NR measurements, wherein F1 can belong to a first frequency group (G1) and F2 can belong to a second frequency group (G2). In this example, per-UE (UE specific) configuration can include a MGRP of 40 ms, which can indicate a time interval between two possible gaps, and a MGL of 6 ms, which can indicate a gap duration length. In this example, frequency group specific (per frequency group) gap assistance information for G1 can include a gap offset for G1 that is equal to 0ms, which can indicate a start position of a gap in the MGRP, as well as a gap bitmap for G1 that is equal to '1100', where a first and second gap can be available for the UE to perform measurement on G1, but a third and fourth gap can be punctured/muted, i.e., the UE may not perform measurement on G1 in the third and fourth gap positions for G1. Furthermore, in this example, frequency group specific (per frequency group) gap assistance information for G2 can include a gap offset that is equal to 5 ms, which can indicate a start position of a gap in the MGRP, as well as a gap bitmap that is equal to '0011', where a third and fourth gap can be available for the UE to perform measurement on G2, but a first and second gap can be punctured/muted, i.e., the UE may not perform measurement on G2 in the first and second gap positions for G2. Thus, from a UE perspective, an interval between every two gaps may not be identical, but the UE can use a different gap offset to determine an exact gap position of each frequency group in each MGRP.

In one configuration, a network can signal assistance information to a UE for NR measurement, where the assistance information can include, but is not limited to, a MGRP (e.g., 40 ms or 80 ms), a MGL, and a gap offset to indicate a position of a gap duration within a gap periodicity. The MGRP and the MGL can be configured as a per-UE level, e.g., a UE can use the same MGRP and MGL configuration for the measurement on all of the target frequency layers. The gap offset can be configured as a per frequency layer or per frequency group level, e.g., a UE can use a different gap offset configuration for the measurement on different target frequency layers or target frequency groups. The measurement on different frequency layers or frequency groups can share a measurement resource (e.g., a measurement gap or measurement time). In addition, a total measurement time can be scaled by an amount of frequency layers or frequency groups, e.g., x*MGRP*(number of frequency layers) or y*MGRP*(number of frequency groups), where x is the number of MGRP to conduct the measurement on one frequency layer and y is the number of MGRP to conduct the measurement on one frequency group.

Figure 7:
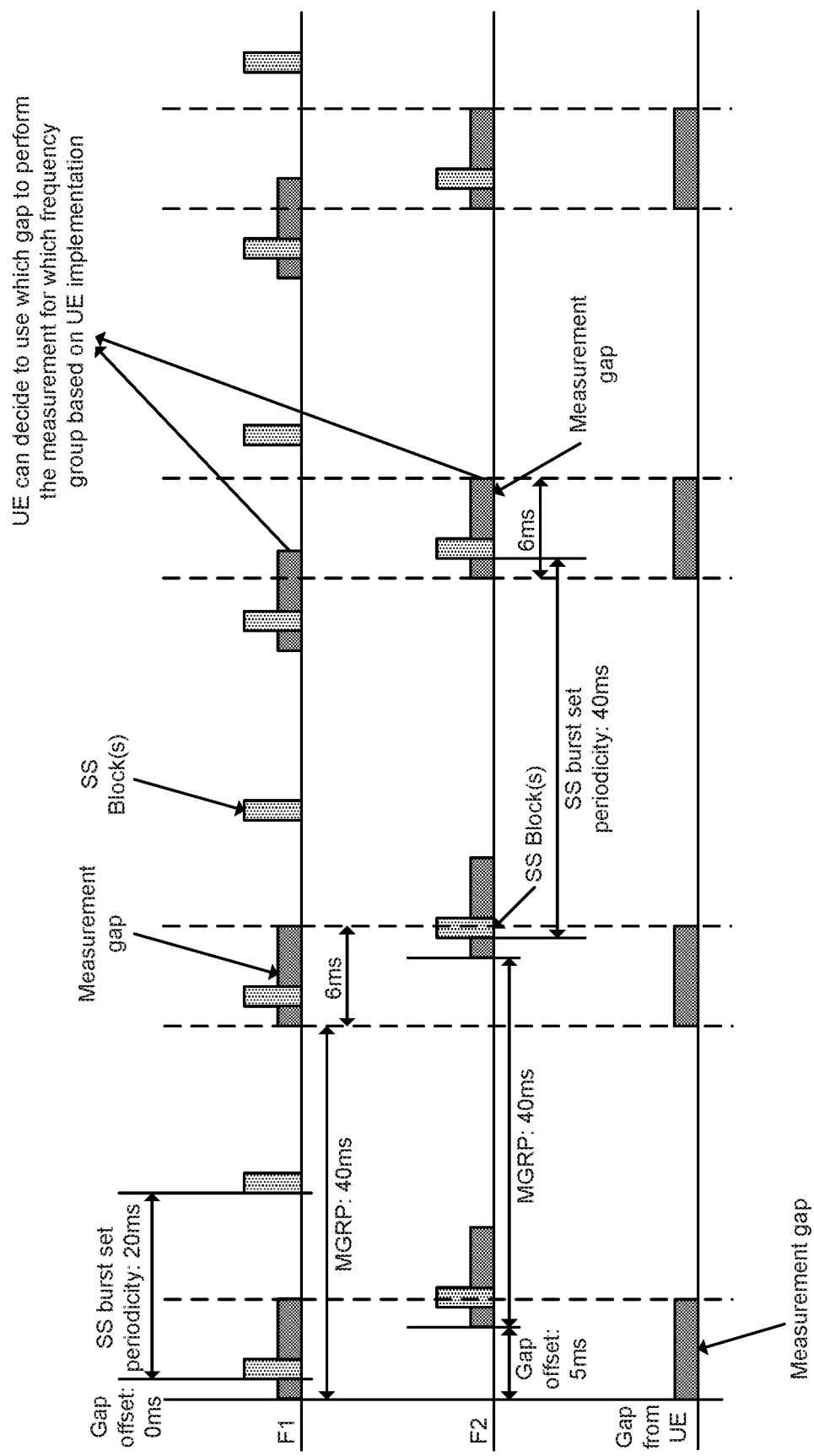
FIG. 7 further illustrates signaling of assistance information for New Radio (NR) measurement in accordance with an example.

FIG. 7 illustrates exemplary signaling of assistance information for New Radio (NR) measurement. In this example, there can be a first frequency layer (F1) and a second frequency layer (F2) for NR measurements, wherein F1 can belong to a first frequency group (G1) and F2 can belong to a second frequency group (G2). In this example, per-UE (UE specific) configuration can include a MGRP of 40 ms, which can indicate a time interval between two possible gaps, and a MGL of 6 ms, which can indicate a gap duration length. In this example, frequency group specific (per frequency group) gap assistance information for G1 can include a gap offset for G1 that is equal to 0ms, which can indicate a start position of a gap in the MGRP. Furthermore, in this example, frequency group specific (per frequency group) gap assistance information for G2 can include a gap offset that is equal to 5 ms, which can indicate a start position of a gap in the MGRP.

In this example, since there is no bitmap to indicate which gap is available in each MGRP, the UE can determine which gap to use to perform the measurement for a certain frequency group based on UE implementation in each MGRP.

For example, as shown in FIG. 7, the UE can determine to use a gap in a first and second MGRP to measure the SS for G1, and the UE can determine to use a gap in a third and fourth MGRP to measure the SS for G2. Thus, from a UE perspective, an interval between every two gaps may not be identical.

Figure 8:
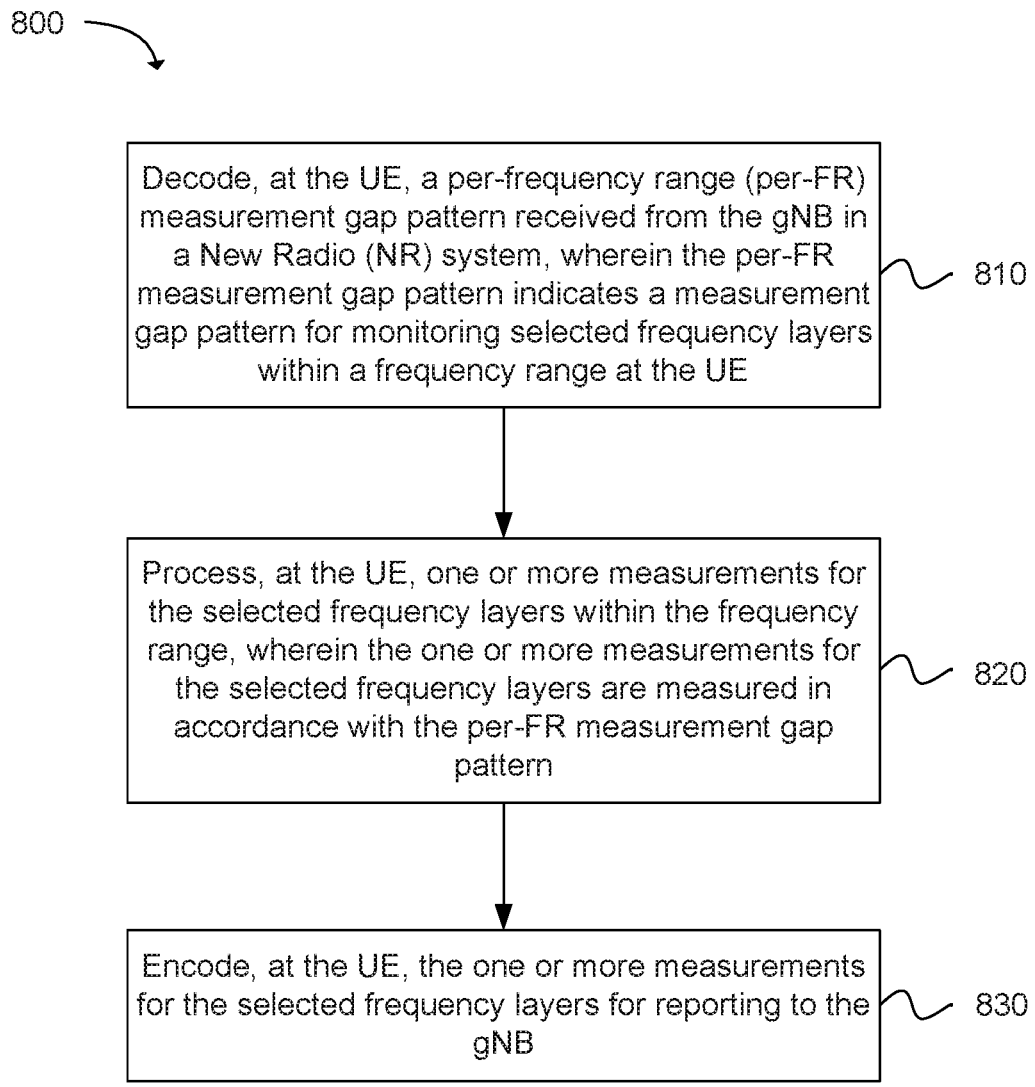
FIG. 8 depicts functionality of a user equipment (UE) operable to decode measurement gap patterns received from a Next Generation NodeB (gNB) in accordance with an example.

Another example provides functionality 800 of a user equipment (UE) operable to decode measurement gap patterns received from a Next Generation NodeB (gNB), as shown in FIG. 8. The UE can comprise one or more processors configured to decode, at the UE, a per-frequency range (per-FR) measurement gap pattern received from the gNB in a New Radio (NR) system, wherein the per-FR measurement gap pattern indicates a measurement gap pattern for monitoring selected frequency layers within a frequency range at the UE, as in block 810. The UE can comprise one or more processors configured to process, at the UE, one or more measurements for the selected frequency layers within the frequency range, wherein the one or more measurements for the selected frequency layers are measured in accordance with the per-FR measurement gap pattern, as in block 820. The UE can comprise one or more processors configured to encode, at the UE, the one or more measurements for the selected frequency layers for reporting to the gNB, as in block 830. In addition, the UE can comprise a memory interface configured to send to a memory the per-FR measurement gap pattern.

Figure 9:
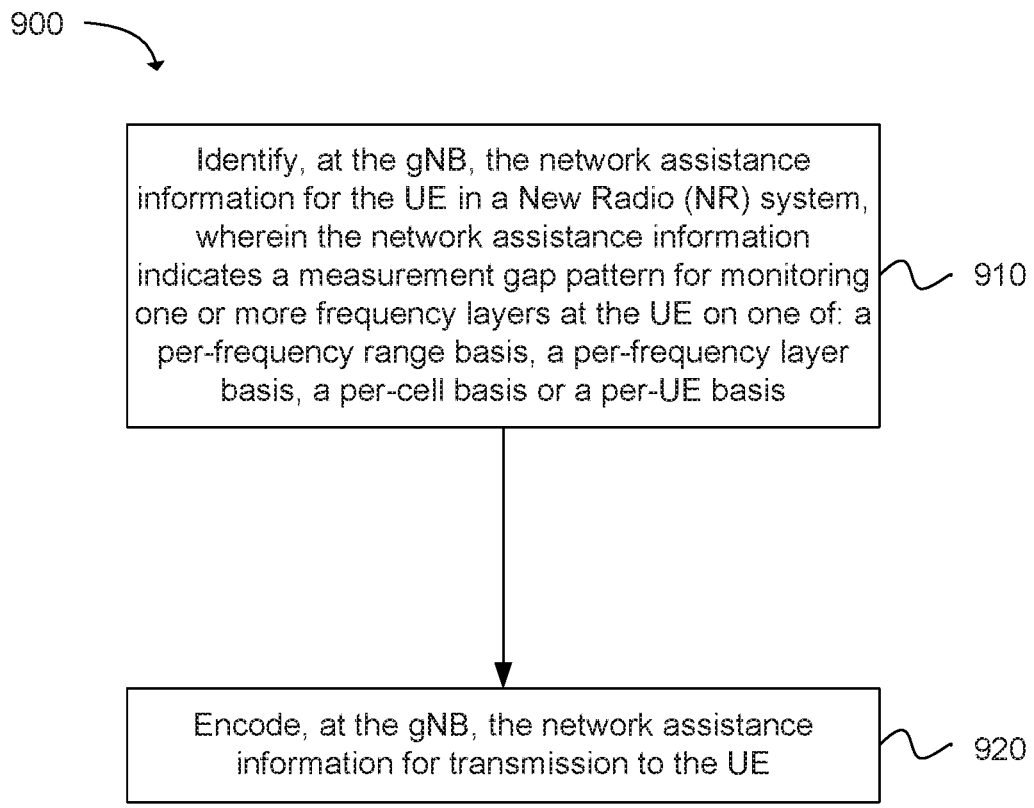
FIG. 9 depicts functionality of a Next Generation NodeB (gNB) operable to encode measurement assistance information for transmission to a user equipment (UE) in accordance with an example.

Another example provides functionality 900 of a Next Generation NodeB (gNB) operable to encode measurement assistance information for transmission to a user equipment (UE), as shown in FIG. 9. The gNB can comprise one or more processors configured to identify, at the gNB, the network assistance information for the UE in a New Radio (NR) system, wherein the network assistance information indicates a measurement gap pattern for monitoring one or more frequency layers at the UE on one of: a per-frequency range basis, a per-frequency layer basis, a per-cell basis or a per-UE basis, as in block 910. The gNB can comprise one or more processors configured to encode, at the gNB, the network assistance information for transmission to the UE, as in block 920. In addition, the gNB can comprise a memory interface configured to retrieve from a memory the network assistance information.

Figure 10:
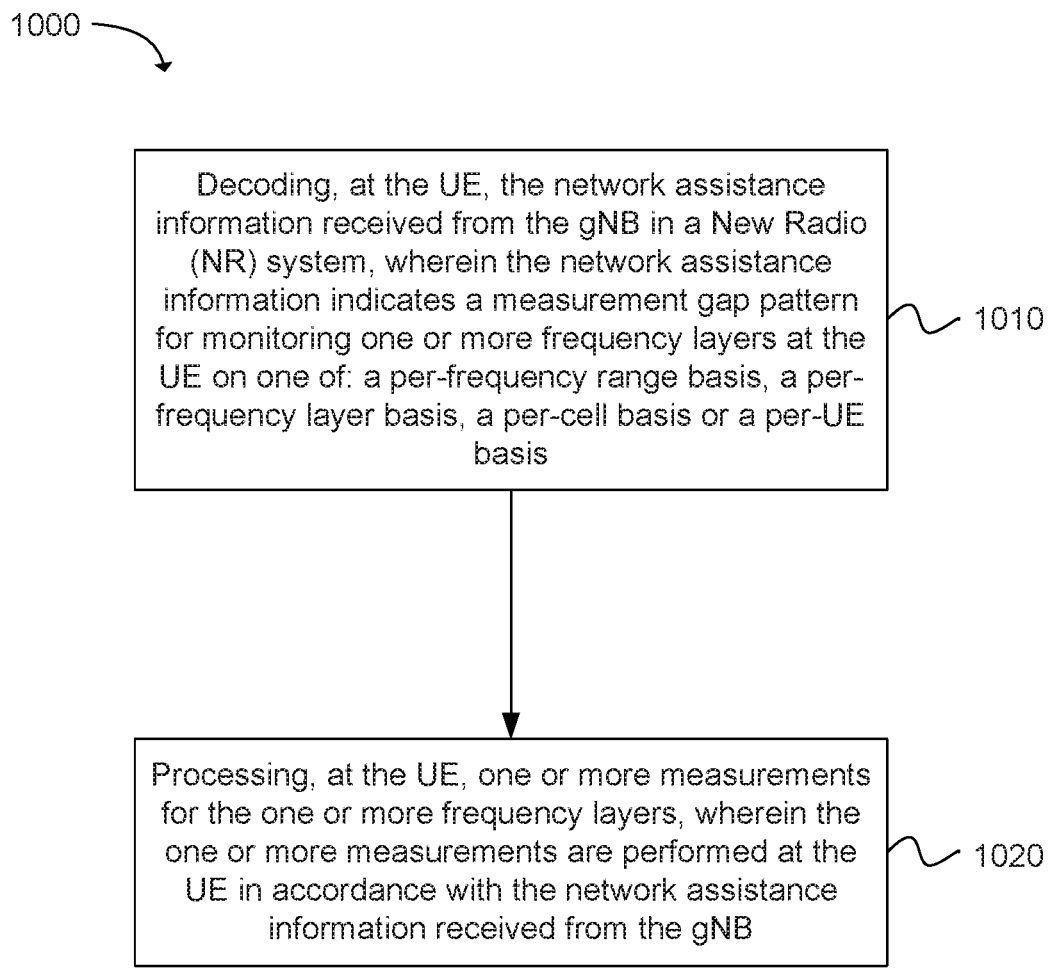
FIG. 10 depicts a flowchart of a machine readable storage medium having instructions embodied thereon for decoding measurement assistance information received at a user equipment (UE) from a Next Generation NodeB (gNB) in accordance with an example.

Another example provides at least one machine readable storage medium having instructions 1000 embodied thereon for decoding measurement assistance information received at a user equipment (UE) from a Next Generation NodeB (gNB), as shown in FIG. 10. The instructions can be executed on a machine, where the instructions are included on at least one computer readable medium or one non-transitory machine readable storage medium. The instructions when executed by one or more processors of the UE perform: decoding, at the UE, the network assistance information received from the gNB in a New Radio (NR) system, wherein the network assistance information indicates a measurement gap pattern for monitoring one or more frequency layers at the UE on one of: a per-frequency range basis, a per-frequency layer basis, a per-cell basis or a per-UE basis, as in block 1010. The instructions when executed by one or more processors of the UE perform: processing, at the UE, one or more measurements for the one or more frequency layers, wherein the one or more measurements are performed at the UE in accordance with the network assistance information received from the gNB, as in block 1020.

Figure 11:
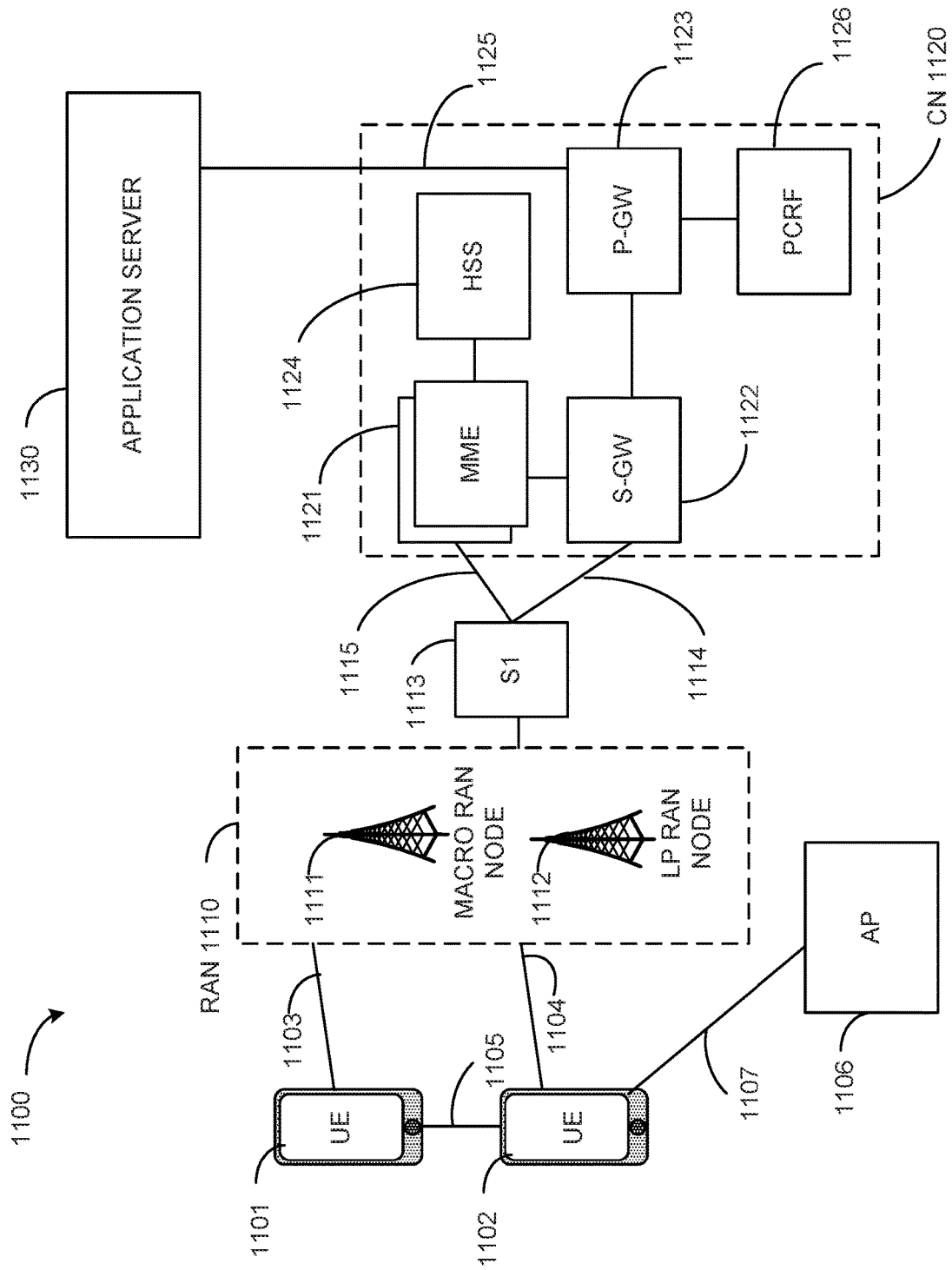
FIG. 11 illustrates an architecture of a wireless network in accordance with an example.

FIG. 11 illustrates an architecture of a system 1100 of a network in accordance with some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110—the RAN 1110 may be, for example, an Evolved Universal Mobile Telecommunications System (UMTS) Terrestrial Radio Access Network (E-UTRAN), a NextGen RAN (NG RAN), or some other type of RAN. The UEs 1101 and 1102 utilize connections 1103 and 1104, respectively, each of which comprises a physical communications interface or layer (discussed in further detail below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can comprise a local wireless connection, such as a connection consistent with any IEEE 1202.15 protocol, wherein the AP 1106 would comprise a wireless fidelity (WiFi®) router. In this example, the AP 1106 is shown to be connected to the Internet without connecting to the core network of the wireless system (described in further detail below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 1102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1110 is shown to be communicatively coupled to a core network (CN) 1120—via an S1 interface 1113. In embodiments, the CN 1120 may be an evolved packet core (EPC) network, a NextGen Packet Core (NPC) network, or some other type of CN. In this embodiment the S1 interface 1113 is split into two parts: the S1-U interface 1114, which carries traffic data between the RAN nodes 1111 and 1112 and the serving gateway (S-GW) 1122, and the S1-mobility management entity (MME) interface 1115, which is a signaling interface between the RAN nodes 1111 and 1112 and MMEs 1121.

In this embodiment, the CN 1120 comprises the MMEs 1121, the S-GW 1122, the Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may comprise a database for network users, including subscription-related information to support the network entities' handling of communication sessions. The CN 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the EPC network 1123 and external networks such as a network including the application server 1130 (alternatively referred to as application function (AF)) via an Internet Protocol (IP) interface 1125. Generally, the application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. Policy and Charging Enforcement Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
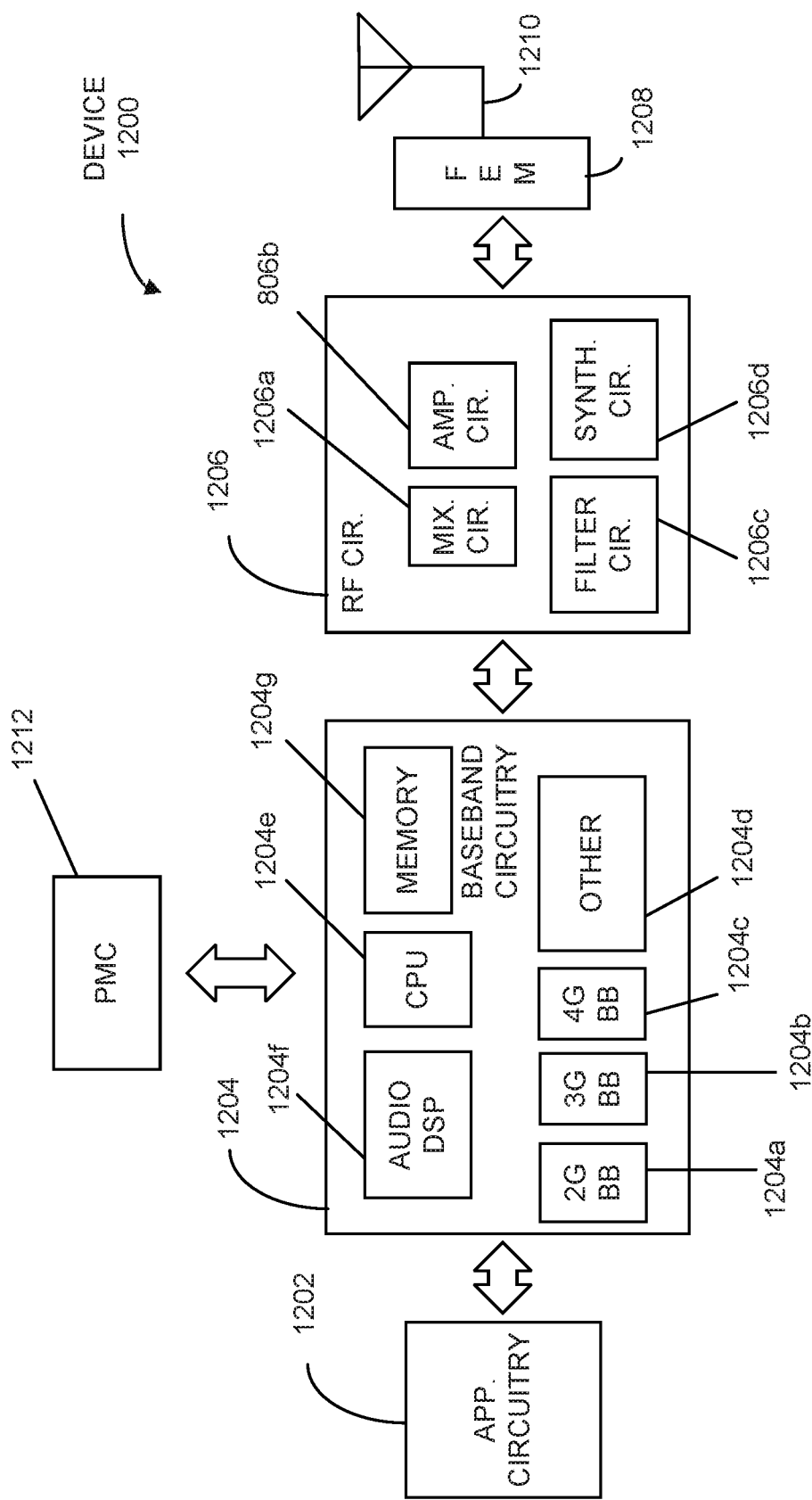
FIG. 12 illustrates a diagram of a wireless device (e.g., UE) in accordance with an example.

FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include less elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband processing circuitry 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204a, a fourth generation (4G) baseband processor 1204b, a fifth generation (5G) baseband processor 1204c, or other baseband processor(s) 1204d for other existing generations, generations in development or to be developed in the future (e.g., second generation (2G), sixth generation (6G), etc.). The baseband circuitry 1204 (e.g., one or more of baseband processors 1204a-d) may handle various radio control functions that enable communication with one or more radio networks via the RF circuitry 1206. In other embodiments, some or all of the functionality of baseband processors 1204a-d may be included in modules stored in the memory 1204g and executed via a Central Processing Unit (CPU) 1204e. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204f. The audio DSP(s) 1204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a necessity. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct downconversion and direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a necessity. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop.

In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM 1208, or in both the RF circuitry 1206 and the FEM 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

While FIG. 12 shows the PMC 1212 coupled only with the baseband circuitry 1204. However, in other embodiments, the PMC 1212 may be additionally or alternatively coupled with, and perform similar power management operations for, other components such as, but not limited to, application circuitry 1202, RF circuitry 1206, or FEM 1208.

In some embodiments, the PMC 1212 may control, or otherwise be part of, various power saving mechanisms of the device 1200. For example, if the device 1200 is in an RRC Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it can transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used execute Layer 3, Layer 2, or Layer 1 functionality, while processors of the application circuitry 1204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
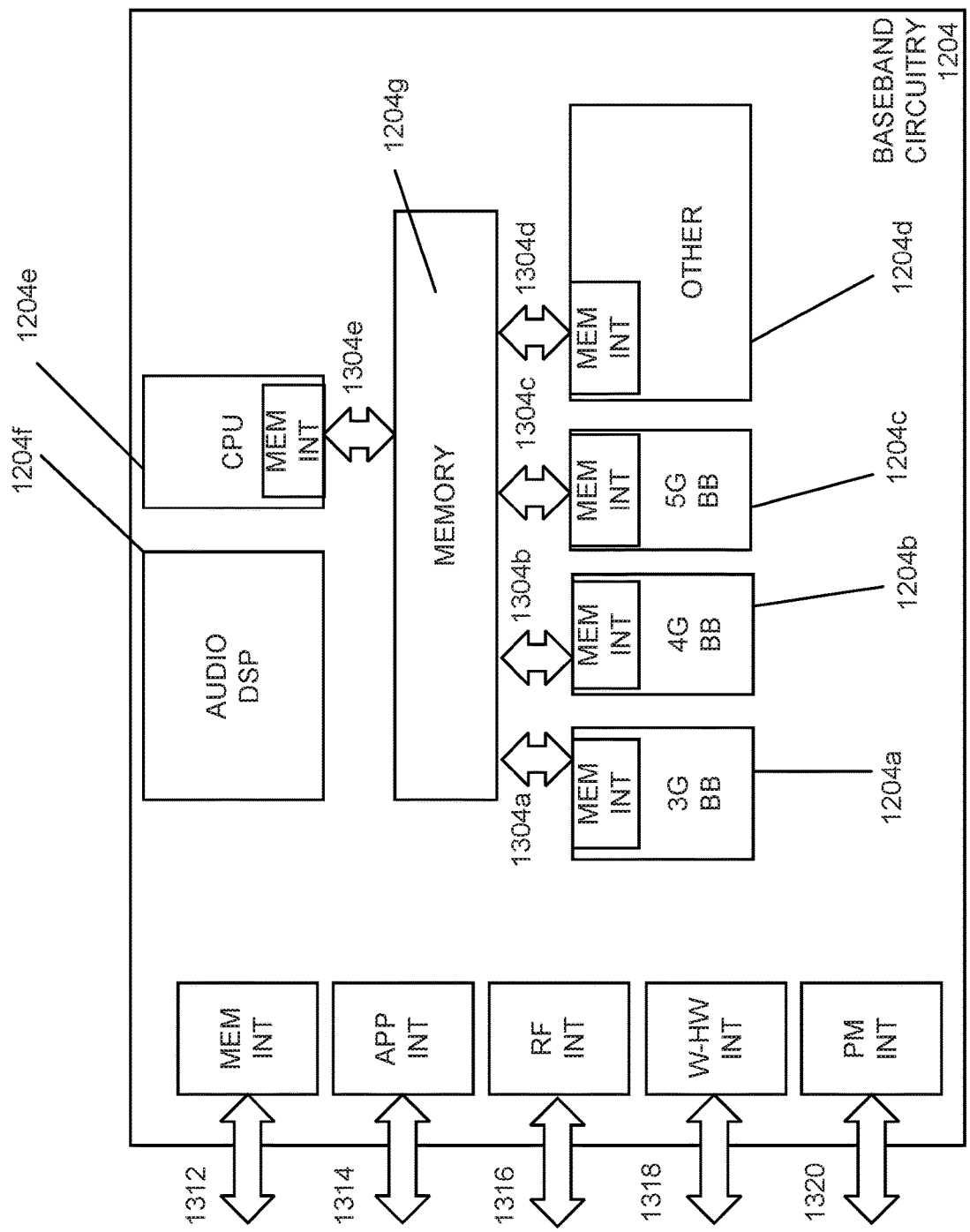
FIG. 13 illustrates interfaces of baseband circuitry in accordance with an example.

FIG. 13 illustrates example interfaces of baseband circuitry in accordance with some embodiments. As discussed above, the baseband circuitry 1204 of FIG. 12 may comprise processors 1204a-1204e and a memory 1204g utilized by said processors. Each of the processors 1204a-1204e may include a memory interface, 1304a-1304e, respectively, to send/receive data to/from the memory 1204g.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212.

Figure 14:
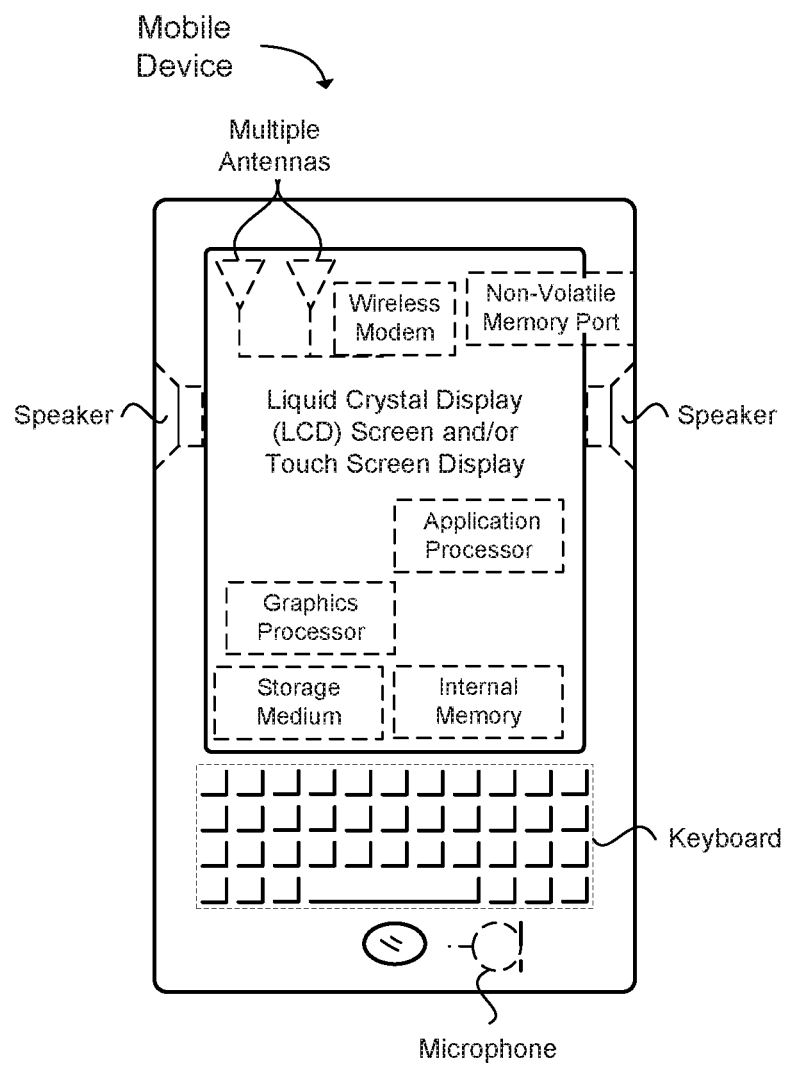
FIG. 14 illustrates a diagram of a wireless device (e.g., UE) in accordance with an example.

FIG. 14 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 14 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to decode measurement gap patterns received from a Next Generation NodeB (gNB), the apparatus comprising: one or more processors configured to: decode, at the UE, a per-frequency range (per-FR) measurement gap pattern received from the gNB in a New Radio (NR) system, wherein the per-FR measurement gap pattern indicates a measurement gap pattern for monitoring selected frequency layers within a frequency range at the UE; process, at the UE, one or more measurements for the selected frequency layers within the frequency range, wherein the one or more measurements for the selected frequency layers are measured in accordance with the per-FR measurement gap pattern; and encode, at the UE, the one or more measurements for the selected frequency layers for reporting to the gNB; and a memory interface configured to send to a memory the per-FR measurement gap pattern.

Example 2 includes the apparatus of Example 1, further comprising a transceiver configured to receive the per-FR measurement gap pattern from the gNB.

Example 3 includes the apparatus of any of Examples 1 to 2, wherein the per-FR measurement gap pattern received from the gNB includes a gap pattern identifier (ID) that corresponds to the per-FR measurement gap pattern.

Example 4 includes the apparatus of any of Examples 1 to 3, wherein the per-FR measurement gap pattern received from the gNB includes a measurement gap length (MGL) that corresponds to the per-FR measurement gap pattern.

Example 5 includes the apparatus of any of Examples 1 to 4, wherein the MGL is 6 milliseconds (ms).

Example 6 includes the apparatus of any of Examples 1 to 5, wherein the per-FR measurement gap pattern received from the gNB includes a measurement gap repetition period (MGRP) that corresponds to the per-FR measurement gap pattern.

Example 7 includes the apparatus of any of Examples 1 to 6, wherein the MGRP is 40 milliseconds (ms).

Example 8 includes the apparatus of any of Examples 1 to 7, wherein the one or more processors are further configured to perform concurrent monitoring of the frequency layers within the frequency range independently using the per-FR measurement gap pattern.

Example 9 includes an apparatus of a Next Generation NodeB (gNB) operable to encode measurement assistance information for transmission to a user equipment (UE), the apparatus comprising: one or more processors configured to: identify, at the gNB, the network assistance information for the UE in a New Radio (NR) system, wherein the network assistance information indicates a measurement gap pattern for monitoring one or more frequency layers at the UE on one of: a per-frequency range basis, a per-frequency layer basis, a per-cell basis or a per-UE basis; and encode, at the gNB, the network assistance information for transmission to the UE; and a memory interface configured to retrieve from a memory the network assistance information.

Example 10 includes the apparatus of Example 9, wherein the network assistance information for monitoring the one or more frequency layers on the per-frequency range basis includes at least one of: a frequency group identifier (ID) that indicates an index for a frequency group; an absolute frequency that corresponds to the frequency group; a measurement gap periodicity; a measurement gap time offset within the measurement gap periodicity; a measurement gap length; a measurement gap number that indicates a level of measurement gap assigned to the frequency group; a synchronization signal (SS) block number that indicates a potential number of SS blocks within the measurement gap pattern; and an SS block bitmap to indicate SS blocks that are punctured.

Example 11 includes the apparatus of any of Examples 9 to 10, wherein the network assistance information for monitoring the one or more frequency layers on the per-frequency layer basis includes at least one of: an absolute frequency that corresponds to the one or more frequency layers; a measurement gap periodicity; a measurement gap time offset within the measurement gap periodicity; a measurement gap length; a measurement gap number that indicates a level of measurement gap assigned to the frequency; a synchronization signal (SS) block number that indicates a potential number of SS blocks within the measurement gap pattern; and an SS block bitmap to indicate SS blocks that are punctured.

Example 12 includes the apparatus of any of Examples 9 to 11, wherein the network assistance information for monitoring the one or more frequency layers on the per-cell basis includes at least one of: an absolute frequency that corresponds to the one or more frequency layers; a physical cell identifier (PCI); a measurement gap periodicity; a measurement gap time offset within the measurement gap periodicity; a measurement gap length; a measurement gap number that indicates a level of measurement gap assigned to the frequency; a synchronization signal (SS) block number that indicates a potential number of SS blocks within the measurement gap pattern; and an SS block bitmap to indicate SS blocks that are punctured.

Example 13 includes the apparatus of any of Examples 9 to 12, wherein the one or more frequency layers are included in a same frequency group when synchronization signal (SS) blocks in a first SS burst periodicity (T1) on a first frequency layer (F1) and SS blocks in a second SS burst periodicity (T2) on a second frequency layer (F2) are within a measurement gap length (MGL) or a defined gap period.

Example 14 includes the apparatus of any of Examples 9 to 13, wherein the one or more frequency layers are included in a same frequency group when a time difference between an earliest timing of synchronization signal (SS) blocks in a first SS burst periodicity (T1) on a first frequency layer (F1) and a latest timing of SS blocks in a second SS burst periodicity (T2) on a second frequency layer (F2) is less than or equal to a measurement gap length (MGL) or a defined gap period.

Example 15 includes the apparatus of any of Examples 9 to 14, wherein the network assistance information includes a bitmap for the measurement gap pattern that indicates a measurement gap usage availability, wherein a '1' in the bitmap indicates that a measurement gap occasion is available to use by the UE and a '0' in the bitmap indicates that a measurement gap occasion is punctured or muted and is not available to use by the UE.

Example 16 includes the apparatus of any of Examples 9 to 15, wherein the network assistance information for monitoring the one or more frequency layers includes at least one of: a measurement gap repetition period (MGRP); a measurement gap length (MGL); a measurement gap offset that indicates a position of a measurement gap duration within a measurement gap periodicity; and a measurement gap bitmap that indicates a measurement gap usage availability, wherein the MGRP and the MGL are configured on a per-UE level, and the measurement gap offset and the measurement gap bitmap are configured on a per-frequency layer level or a per-frequency group level.

Example 17 includes the apparatus of any of Examples 9 to 16, wherein the network assistance information for monitoring the one or more frequency layers includes at least one of: a measurement gap repetition period (MGRP); a measurement gap length (MGL); and a measurement gap offset that indicates a position of a measurement gap duration within a measurement gap periodicity, wherein the MGRP and the MGL are configured on a per-UE level, and the measurement gap offset is configured on a per-frequency layer level or a per-frequency group level.

Example 18 includes at least one machine readable storage medium having instructions embodied thereon for decoding measurement assistance information received at a user equipment (UE) from a Next Generation NodeB (gNB), the instructions when executed by one or more processors at the UE perform the following: decoding, at the UE, the network assistance information received from the gNB in a New Radio (NR) system, wherein the network assistance information indicates a measurement gap pattern for monitoring one or more frequency layers at the UE on one of: a per-frequency range basis, a per-frequency layer basis, a per-cell basis or a per-UE basis; and processing, at the UE, one or more measurements for the one or more frequency layers, wherein the one or more measurements are performed at the UE in accordance with the network assistance information received from the gNB.

Example 19 includes the at least one machine readable storage medium of Example 18, wherein the network assistance information for monitoring the one or more frequency layers on the per-frequency range basis includes at least one of: a frequency group identifier (ID) that indicates an index for a frequency group; an absolute frequency that corresponds to the frequency group; a measurement gap periodicity; a measurement gap time offset within the measurement gap periodicity; a measurement gap length; a measurement gap number that indicates a level of measurement gap assigned to the frequency group; a synchronization signal (SS) block number that indicates a potential number of SS blocks within the measurement gap pattern; and an SS block bitmap to indicate SS blocks that are punctured.

Example 20 includes the at least one machine readable storage medium of any of Examples 18 to 19, wherein the network assistance information for monitoring the one or more frequency layers on the per-frequency layer basis includes at least one of: an absolute frequency that corresponds to the one or more frequency layers; a measurement gap periodicity; a measurement gap time offset within the measurement gap periodicity; a measurement gap length; a measurement gap number that indicates a level of measurement gap assigned to the frequency; a synchronization signal (SS) block number that indicates a potential number of SS blocks within the measurement gap pattern; and an SS block bitmap to indicate SS blocks that are punctured.

Example 21 includes the at least one machine readable storage medium of any of Examples 18 to 20, wherein the network assistance information for monitoring the one or more frequency layers on the per-cell basis includes at least one of: an absolute frequency that corresponds to the one or more frequency layers; a physical cell identifier (PCI); a measurement gap periodicity; a measurement gap time offset within the measurement gap periodicity; a measurement gap length; a measurement gap number that indicates a level of measurement gap assigned to the frequency; a synchronization signal (SS) block number that indicates a potential number of SS blocks within the measurement gap pattern; and an SS block bitmap to indicate SS blocks that are punctured.

Example 22 includes the at least one machine readable storage medium of any of Examples 18 to 21, wherein the one or more frequency layers are included in a same frequency group when synchronization signal (SS) blocks in a first SS burst periodicity (T1) on a first frequency layer (F1) and SS blocks in a second SS burst periodicity (T2) on a second frequency layer (F2) are within a measurement gap length (MGL) or a defined gap period.

Example 23 includes the at least one machine readable storage medium of any of Examples 18 to 22, wherein the one or more frequency layers are included in a same frequency group when a time difference between an earliest timing of synchronization signal (SS) blocks in a first SS burst periodicity (T1) on a first frequency layer (F1) and a latest timing of SS blocks in a second SS burst periodicity (T2) on a second frequency layer (F2) is less than or equal to a measurement gap length (MGL) or a defined gap period.

Example 24 includes the at least one machine readable storage medium of any of Examples 18 to 23, wherein the network assistance information includes a bitmap for the measurement gap pattern that indicates a measurement gap usage availability, wherein a '1' in the bitmap indicates that a measurement gap occasion is available to use by the UE and a '0' in the bitmap indicates that a measurement gap occasion is punctured or muted and is not available to use by the UE.

Example 25 includes the at least one machine readable storage medium of any of Examples 18 to 24, wherein the network assistance information for monitoring the one or more frequency layers includes at least one of: a measurement gap repetition period (MGRP); a measurement gap length (MGL); a measurement gap offset that indicates a position of a measurement gap duration within a measurement gap periodicity; and a measurement gap bitmap that indicates a measurement gap usage availability, wherein the MGRP and the MGL are configured on a per-UE level, and the measurement gap offset and the measurement gap bitmap are configured on a per-frequency layer level or a per-frequency group level.

Example 26 includes the at least one machine readable storage medium of any of Examples 18 to 25, wherein the network assistance information for monitoring the one or more frequency layers includes at least one of: a measurement gap repetition period (MGRP); a measurement gap length (MGL); and a measurement gap offset that indicates a position of a measurement gap duration within a measurement gap periodicity, wherein the MGRP and the MGL are configured on a per-UE level, and the measurement gap offset is configured on a per-frequency layer level or a per-frequency group level.

Example 27 includes a user equipment (UE) operable to decode measurement assistance information received from a Next Generation NodeB (gNB), the UE comprising: means for decoding, at the UE, the network assistance information received from the gNB in a New Radio (NR) system, wherein the network assistance information indicates a measurement gap pattern for monitoring one or more frequency layers at the UE on one of: a per-frequency range basis, a per-frequency layer basis, a per-cell basis or a per-UE basis; and means for processing, at the UE, one or more measurements for the one or more frequency layers, wherein the one or more measurements are performed at the UE in accordance with the network assistance information received from the gNB.

Example 28 includes the UE of Example 27, wherein the network assistance information for monitoring the one or more frequency layers on the per-frequency range basis includes at least one of: a frequency group identifier (ID) that indicates an index for a frequency group; an absolute frequency that corresponds to the frequency group; a measurement gap periodicity; a measurement gap time offset within the measurement gap periodicity; a measurement gap length; a measurement gap number that indicates a level of measurement gap assigned to the frequency group; a synchronization signal (SS) block number that indicates a potential number of SS blocks within the measurement gap pattern; and an SS block bitmap to indicate SS blocks that are punctured.

Example 29 includes the UE of any of Examples 27 to 28, wherein the network assistance information for monitoring the one or more frequency layers on the per-frequency layer basis includes at least one of: an absolute frequency that corresponds to the one or more frequency layers; a measurement gap periodicity; a measurement gap time offset within the measurement gap periodicity; a measurement gap length; a measurement gap number that indicates a level of measurement gap assigned to the frequency; a synchronization signal (SS) block number that indicates a potential number of SS blocks within the measurement gap pattern; and an SS block bitmap to indicate SS blocks that are punctured.

Example 30 includes the UE of any of Examples 27 to 29, wherein the network assistance information for monitoring the one or more frequency layers on the per-cell basis includes at least one of: an absolute frequency that corresponds to the one or more frequency layers; a physical cell identifier (PCI); a measurement gap periodicity; a measurement gap time offset within the measurement gap periodicity; a measurement gap length; a measurement gap number that indicates a level of measurement gap assigned to the frequency; a synchronization signal (SS) block number that indicates a potential number of SS blocks within the measurement gap pattern; and an SS block bitmap to indicate SS blocks that are punctured.

Example 31 includes the UE of any of Examples 27 to 30, wherein the one or more frequency layers are included in a same frequency group when synchronization signal (SS) blocks in a first SS burst periodicity (T1) on a first frequency layer (F1) and SS blocks in a second SS burst periodicity (T2) on a second frequency layer (F2) are within a measurement gap length (MGL) or a defined gap period.

Example 32 includes the UE of any of Examples 27 to 31, wherein the one or more frequency layers are included in a same frequency group when a time difference between an earliest timing of synchronization signal (SS) blocks in a first SS burst periodicity (T1) on a first frequency layer (F1) and a latest timing of SS blocks in a second SS burst periodicity (T2) on a second frequency layer (F2) is less than or equal to a measurement gap length (MGL) or a defined gap period.

Example 33 includes the UE of any of Examples 27 to 32, wherein the network assistance information includes a bitmap for the measurement gap pattern that indicates a measurement gap usage availability, wherein a '1' in the bitmap indicates that a measurement gap occasion is available to use by the UE and a '0' in the bitmap indicates that a measurement gap occasion is punctured or muted and is not available to use by the UE.

Example 34 includes the UE of any of Examples 27 to 33, wherein the network assistance information for monitoring the one or more frequency layers includes at least one of: a measurement gap repetition period (MGRP); a measurement gap length (MGL); a measurement gap offset that indicates a position of a measurement gap duration within a measurement gap periodicity; and a measurement gap bitmap that indicates a measurement gap usage availability, wherein the MGRP and the MGL are configured on a per-UE level, and the measurement gap offset and the measurement gap bitmap are configured on a per-frequency layer level or a per-frequency group level.

Example 35 includes the UE of any of Examples 27 to 34, wherein the network assistance information for monitoring the one or more frequency layers includes at least one of: a measurement gap repetition period (MGRP); a measurement gap length (MGL); and a measurement gap offset that indicates a position of a measurement gap duration within a measurement gap periodicity, wherein the MGRP and the MGL are configured on a per-UE level, and the measurement gap offset is configured on a per-frequency layer level or a per-frequency group level.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member.

Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a user equipment (UE) operable to decode measurement gap patterns received from a base station, the apparatus comprising:
   one or more processors configured to:
      decode, at the UE, network assistance information including a per-frequency range (per-FR) measurement gap pattern received from the base station in a New Radio (NR) system, wherein the per-FR measurement gap pattern indicates a measurement gap pattern for monitoring selected frequency layers within a frequency range at the UE, wherein the network assistance information includes a bitmap for the measurement gap pattern that indicates a measurement gap usage availability, and wherein a '1' in the bitmap indicates that a measurement gap occasion is available to use by the UE and a '0' in the bitmap indicates that the measurement gap occasion is punctured or muted and is not available to use by the UE;
      process, at the UE, one or more measurements for the selected frequency layers within the frequency range, wherein the one or more measurements for the selected frequency layers are measured in accordance with the per-FR measurement gap pattern; and
      encode, at the UE, the one or more measurements for the selected frequency layers for reporting to the base station; and
   a memory interface configured to send to a memory the per-FR measurement gap pattern.

2. The apparatus of claim 1, further comprising a transceiver configured to receive the network assistance information including the per-FR measurement gap pattern from the base station.

3. The apparatus of claim 1, wherein the per-FR measurement gap pattern received from the base station includes a gap pattern identifier (ID) that corresponds to the per-FR measurement gap pattern.

4. The apparatus of claim 1, wherein the per-FR measurement gap pattern received from the base station includes a measurement gap length (MGL) that corresponds to the per-FR measurement gap pattern.

5. The apparatus of claim 4, wherein the MGL is 6 milliseconds (ms).

6. The apparatus of claim 1, wherein the per-FR measurement gap pattern received from the base station includes a measurement gap repetition period (MGRP) that corresponds to the per-FR measurement gap pattern.

7. The apparatus of claim 6, wherein the MGRP is 40 milliseconds (ms) or 80 ms.

8. The apparatus of claim 1, wherein the one or more processors are further configured to perform concurrent monitoring of the frequency layers within the frequency range independently using the per-FR measurement gap pattern.

9. The apparatus of claim 1, wherein the one or more processors are further configured to measure the selected frequency layers within the frequency range in accordance with the per-FR measurement gap pattern.

10. An apparatus of a base station operable to encode network assistance information for transmission to a user equipment (UE), the apparatus comprising:
    one or more processors configured to:
       identify, at the base station, the network assistance information for the UE in a New Radio (NR) system, wherein the network assistance information indicates a measurement gap pattern for monitoring one or more frequency layers at the UE on one of: a per-frequency range basis, a per-frequency layer basis, a per-cell basis or a per-UE basis, wherein the network assistance information includes a bitmap for the measurement gap pattern that indicates a measurement gap usage availability, and wherein a '1' in the bitmap indicates that a measurement gap occasion is available to use by the UE and a '0' in the bitmap indicates that the measurement gap occasion is punctured or muted and is not available to use by the UE; and
       encode, at the base station, the network assistance information for transmission to the UE; and
    a memory interface configured to retrieve from a memory the network assistance information.

11. The apparatus of claim 10, further comprising a transceiver configured to transmit the network assistance information to the UE.

12. The apparatus of claim 10, wherein the network assistance information for monitoring the one or more frequency layers on the per-frequency range basis includes at least one of:
    a frequency group identifier (ID) that indicates an index for a frequency group;
    an absolute frequency that corresponds to the frequency group;
    a measurement gap periodicity;
    a measurement gap time offset within the measurement gap periodicity;
    a measurement gap length;
    a measurement gap number that indicates a level of measurement gap assigned to the frequency group;

a synchronization signal (SS) block number that indicates a potential number of SS blocks within the measurement gap pattern; and
an SS block bitmap to indicate SS blocks that are punctured.

13. The apparatus of claim 10, wherein the network assistance information for monitoring the one or more frequency layers on the per-frequency layer basis includes at least one of:
   an absolute frequency that corresponds to the one or more frequency layers;
   a measurement gap periodicity;
   a measurement gap time offset within the measurement gap periodicity;
   a measurement gap length;
   a measurement gap number that indicates a level of measurement gap assigned to the frequency;
   a synchronization signal (SS) block number that indicates a potential number of SS blocks within the measurement gap pattern; and
   an SS block bitmap to indicate SS blocks that are punctured.

14. The apparatus of claim 10, wherein the network assistance information for monitoring the one or more frequency layers on the per-cell basis includes at least one of:
   an absolute frequency that corresponds to the one or more frequency layers;
   a physical cell identifier (PCI);
   a measurement gap periodicity;
   a measurement gap time offset within the measurement gap periodicity;
   a measurement gap length;
   a measurement gap number that indicates a level of measurement gap assigned to the frequency;
   a synchronization signal (SS) block number that indicates a potential number of SS blocks within the measurement gap pattern; and
   an SS block bitmap to indicate SS blocks that are punctured.

15. The apparatus of claim 10, wherein the one or more frequency layers are included in a same frequency group when synchronization signal (SS) blocks in a first SS burst periodicity (T1) on a first frequency layer (F1) and SS blocks in a second SS burst periodicity (T2) on a second frequency layer (F2) are within a measurement gap length (MGL) or a defined gap period.

16. The apparatus of claim 10, wherein the one or more frequency layers are included in a same frequency group when a time difference between an earliest timing of synchronization signal (SS) blocks in a first SS burst periodicity (T1) on a first frequency layer (F1) and a latest timing of SS blocks in a second SS burst periodicity (T2) on a second frequency layer (F2) is less than or equal to a measurement gap length (MGL) or a defined gap period.

17. The apparatus of claim 10, wherein the network assistance information for monitoring the one or more frequency layers includes at least one of:
   a measurement gap repetition period (MGRP);
   a measurement gap length (MGL);
   a measurement gap offset that indicates a position of a measurement gap duration within a measurement gap periodicity; and
   wherein the MGRP and the MGL are configured on a per-UE level, and the measurement gap offset and the bitmap are configured on a per-frequency layer level or a per-frequency group level.

18. The apparatus of claim 10, wherein the network assistance information for monitoring the one or more frequency layers includes at least one of:
   a measurement gap repetition period (MGRP);
   a measurement gap length (MGL); and
   a measurement gap offset that indicates a position of a measurement gap duration within a measurement gap periodicity,
   wherein the MGRP and the MGL are configured on a per-UE level, and the measurement gap offset is configured on a per-frequency layer level or a per-frequency group level.

19. At least one non-transitory machine readable storage medium having instructions embodied thereon for decoding network assistance information received at a user equipment (UE) from a base station, the instructions when executed by one or more processors at the UE perform the following:
   decoding, at the UE, the network assistance information received from the base station in a New Radio (NR) system, wherein the network assistance information indicates a measurement gap pattern for monitoring one or more frequency layers at the UE on one of: a per-frequency range basis, a per-frequency layer basis, a per-cell basis or a per-UE wherein the network assistance information includes a bitmap for the measurement gap pattern that indicates a measurement gap usage availability, and wherein a '1' in the bitmap indicates that a measurement gap occasion is available to use by the UE and a '0' in the bitmap indicates that the measurement gap occasion is punctured or muted and is not available to use by the UE; and
   processing, at the UE, one or more measurements for the one or more frequency layers, wherein the one or more measurements are performed at the UE in accordance with the network assistance information received from the base station.

20. The at least one non-transitory machine readable storage medium of claim 19, wherein the network assistance information for monitoring the one or more frequency layers on the per-frequency range basis includes at least one of:
   a frequency group identifier (ID) that indicates an index for a frequency group;
   an absolute frequency that corresponds to the frequency group;
   a measurement gap periodicity;
   a measurement gap time offset within the measurement gap periodicity;
   a measurement gap length;
   a measurement gap number that indicates a level of measurement gap assigned to the frequency group;
   a synchronization signal (SS) block number that indicates a potential number of SS blocks within the measurement gap pattern; and
   an SS block bitmap to indicate SS blocks that are punctured.

21. The at least one non-transitory machine readable storage medium of claim 19, wherein the network assistance information for monitoring the one or more frequency layers on the per-frequency layer basis includes at least one of:
   an absolute frequency that corresponds to the one or more frequency layers;
   a measurement gap periodicity;
   a measurement gap time offset within the measurement gap periodicity;
   a measurement gap length;
   a measurement gap number that indicates a level of measurement gap assigned to the frequency;

a synchronization signal (SS) block number that indicates a potential number of SS blocks within the measurement gap pattern; and an SS block bitmap to indicate SS blocks that are punctured.

22. The at least one non-transitory machine readable storage medium of claim 19, wherein the network assistance information for monitoring the one or more frequency layers on the per-cell basis includes at least one of:

an absolute frequency that corresponds to the one or more frequency layers;

a physical cell identifier (PCI);

a measurement gap periodicity;

a measurement gap time offset within the measurement gap periodicity;

a measurement gap length;

a measurement gap number that indicates a level of measurement gap assigned to the frequency;

a synchronization signal (SS) block number that indicates a potential number of SS blocks within the measurement gap pattern; and an SS block bitmap to indicate SS blocks that are punctured.

23. The at least one non-transitory machine readable storage medium of claim 19, wherein the one or more frequency layers are included in a same frequency group when synchronization signal (SS) blocks in a first SS burst periodicity (T1) on a first frequency layer (F1) and SS blocks in a second SS burst periodicity (T2) on a second frequency layer (F2) are within a measurement gap length (MGL) or a defined gap period.

24. The at least one non-transitory machine readable storage medium of claim 19, wherein the one or more frequency layers are included in a same frequency group when a time difference between an earliest timing of synchronization signal (SS) blocks in a first SS burst periodicity (T1) on a first frequency layer (F1) and a latest timing of SS blocks in a second SS burst periodicity (T2) on a second frequency layer (F2) is less than or equal to a measurement gap length (MGL) or a defined gap period.

25. The at least one non-transitory machine readable storage medium of claim 19, wherein the network assistance information for monitoring the one or more frequency layers includes at least one of:

a measurement gap repetition period (MGRP);

a measurement gap length (MGL);

a measurement gap offset that indicates a position of a measurement gap duration within a measurement gap periodicity; and wherein the MGRP and the MGL are configured on a per-UE level, and the measurement gap offset and the bitmap are configured on a per-frequency layer level or a per-frequency group level.

26. The at least one non-transitory machine readable storage medium of claim 19, wherein the network assistance information for monitoring the one or more frequency layers includes at least one of:

a measurement gap repetition period (MGRP);

a measurement gap length (MGL); and a measurement gap offset that indicates a position of a measurement gap duration within a measurement gap periodicity, wherein the MGRP and the MGL are configured on a per-UE level, and the measurement gap offset is configured on a per-frequency layer level or a per-frequency group level.

* * * * *